United States Patent
Bouziat et al.

(10) Patent No.: US 12,339,931 B2
(45) Date of Patent: Jun. 24, 2025

(54) METHOD FOR CATEGORIZING A ROCK ON THE BASIS OF AT LEAST ONE IMAGE

(71) Applicant: IFP Energies nouvelles, Rueil-Malmaison (FR)

(72) Inventors: Antoine Bouziat, Rueil-Malmaison (FR); Jean-Claude Lecomte, Rueil-Malmaison (FR); Renaud Divies, Rueil-Malmaison (FR); Sylvain Desroziers, Rueil-Malmaison (FR); Arnaud Cayrol, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 339 days.

(21) Appl. No.: 17/782,673

(22) PCT Filed: Dec. 3, 2020

(86) PCT No.: PCT/EP2020/084389
§ 371 (c)(1),
(2) Date: Jun. 6, 2022

(87) PCT Pub. No.: WO2021/115903
PCT Pub. Date: Jun. 17, 2021

(65) Prior Publication Data
US 2023/0008058 A1  Jan. 12, 2023

(30) Foreign Application Priority Data
Dec. 12, 2019  (FR) ........................ 1914253

(51) Int. Cl.
*G06N 5/01*  (2023.01)
*G06F 18/2413*  (2023.01)
(Continued)

(52) U.S. Cl.
CPC .......... *G06F 18/2413* (2023.01); *G06N 5/01* (2023.01); *G06T 7/73* (2017.01); *G06V 10/46* (2022.01);
(Continued)

(58) Field of Classification Search
CPC ....... G06F 18/2413; G06F 18/24; G06N 5/01; G06T 7/73; G06T 2207/20081;
(Continued)

(56) References Cited

U.S. PATENT DOCUMENTS

2016/0169856 A1* 6/2016 Sung ...................... G01N 33/24
                                                                 703/10
2017/0032532 A1* 2/2017 Andersen ............... G01N 23/04
(Continued)

OTHER PUBLICATIONS

Ran et al, Rock Classification from Field Image Patches Analyzed Using a Deep Convolutional Neural Network, 2019, Mathematics, 7(755): 1-16. (Year: 2019).*

(Continued)

*Primary Examiner* — Kathleen M Broughton
(74) *Attorney, Agent, or Firm* — Fitch, Even, Tabin & Flannery LLP

(57) ABSTRACT

The present invention relates to a rock classification method wherein at least one image (IMA) of the rock to be classified is acquired, and wherein a decision tree (ARB) classifying the rocks according to several descriptors is used, as well as a machine learning method (APP) from a rock image database (BIR). Machine learning is applied for each descriptor considered.

20 Claims, 2 Drawing Sheets

(51) Int. Cl.
*G06T 7/73* (2017.01)
*G06V 10/46* (2022.01)

(52) U.S. Cl.
CPC .............. *G06T 2207/20081* (2013.01); *G06T 2207/20084* (2013.01); *G06T 2207/30181* (2013.01)

(58) Field of Classification Search
CPC ........... G06T 2207/20084; G06T 2207/30181; G06V 10/46
See application file for complete search history.

(56) References Cited

U.S. PATENT DOCUMENTS

2017/0286802 A1* 10/2017 Mezghani ............... E21B 49/02
2019/0087939 A1* 3/2019 Hakimuddin ............. G06T 7/11

OTHER PUBLICATIONS

Imamverdiyev et al, Lithological facies classification using deep convolutional neural network, 2019, J. Petro. Sci. and Eng. 174 (2019): 216-228. (Year: 2018).*

Rispoli et al, Determining the Particle Size of Debris from a Tunnel Boring Machine through Photographic Analysis and Comparison Between Excavation Performance and Rock Mass Properties, 2017, Rock Mech Rock Eng 50: 2805-2816. (Year: 2017).*

Alzubaidi et al, Automated lithology classification from drill core images using CNNs, J. Petro. Sci. Eng. 197: 1-13. (Year: 2021).*

Horrocks et al, Evaluation of automated lithology classification architectures using highly-sampled wireline logs for coal exploration, Computers & Geosciences 83: 209-218. (Year: 2015).*

Zhang, Y., et al.; (2018). "Automatic Identification and Classification in Lithology Based on Deep Learning in Rock Images". Acta Petrol. Sin., 34, 333-342.

Wang, C., et al.; (2018). "Quick Recognition of Rock Images for Mobile Applications". Journal of Engineering Science & Technology Review, 11(4).

Ran, X., et al.; (2019). "Rock Classification from Field Image Patches Analyzed Using a Deep Convolutional Neural Network". Mathematics, 7(8), 755.

Zhang, Y., et al.; (2018). "Automated Classification Analysis of Geological Structures Based on Images Data and Deep Learning Model". Applied Sciences, 8(12), 24.

Hurtik, P, et al.; "An Image Recognition Approach to Classification of Jewelry Stone Defects", 2013 joint IFSA World Congress and NAFIPS Annual meeting IEEE, Jun. 24, 2013 (Jun. 24, 2013), pp. 727-732, Xp032490711, DOI: 10.1109/IFSA-NAFIPS.2013. 6608490.

International Search Report for PCT/EP2020/084389, mailed Feb. 25, 2021, 4 pages.

* cited by examiner

[Fig 1]
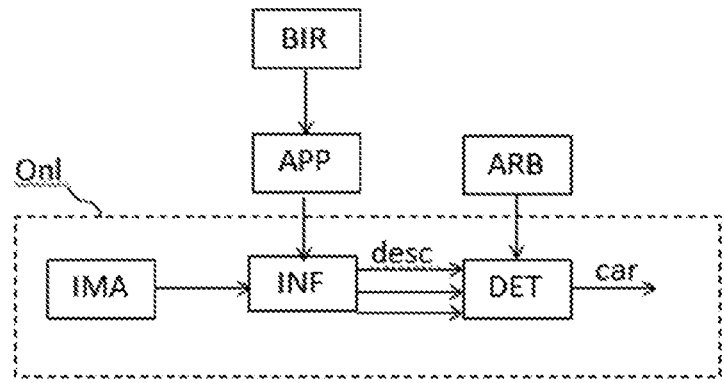
[Fig 2]
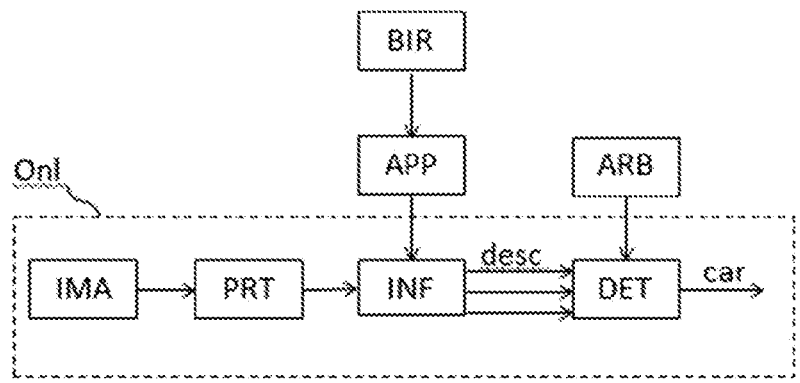
[Fig 3]
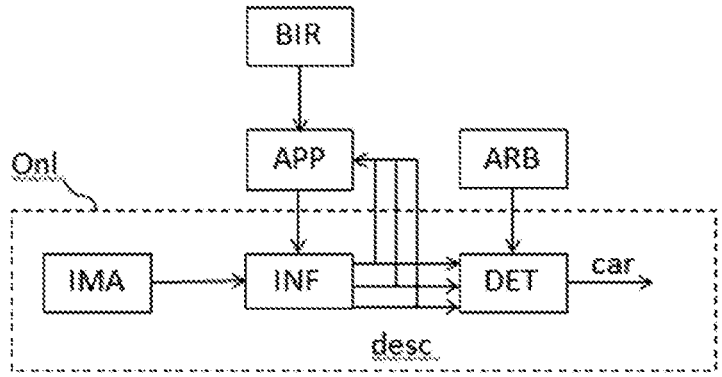

[Fig 4]
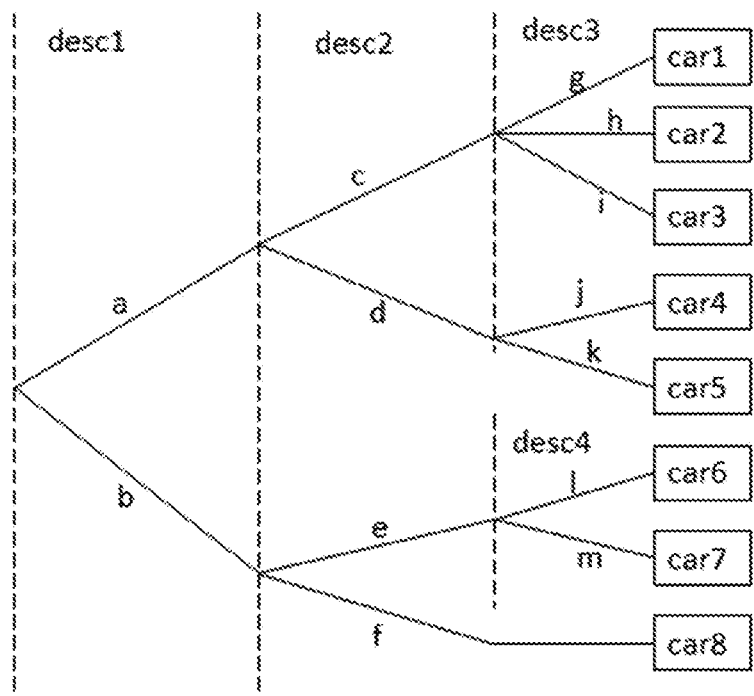
[Fig 5]
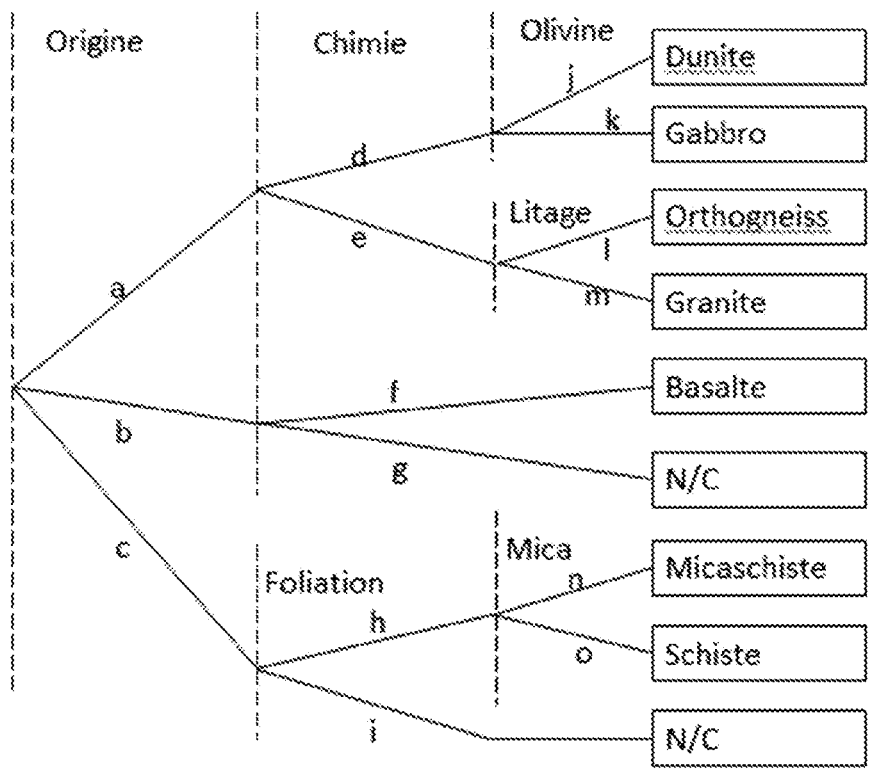

METHOD FOR CATEGORIZING A ROCK ON THE BASIS OF AT LEAST ONE IMAGE

CROSS-REFERENCE TO RELATED APPLICATIONS

Reference is made to PCT/EP2020/084389 filed Dec. 3, 2020, designating the United States, and French Application No. 19/14.253 filed Dec. 12, 2019, which are incorporated herein by reference in their entirety.

BACKGROUND OF THE INVENTION

Field of the Invention

The present invention relates to the field of rock classification, in particular determination of the lithologic facies of rocks.

In many fields, proper classification of rocks is important. For example, in the field of building or engineering structure construction, it is important to know the composition of at least one of the soil and subsoil, notably to adapt the foundations and the structure of the building to at least one of the soil and the subsoil. In the field of raw materials exploitation, for example for quarries, mines, hydrocarbon recovery, etc., knowing the composition of the at least one of the soil and subsoil is essential, notably in order to determine suitable zones, or to determine the tools to be used, etc. There are also other fields for which rock classification is important.

Rock classification generally uses rock samples, drill cuttings, thin sections, etc., and a geologist's expertise is required. This classification therefore is error-prone and it can be imprecise. There also is a need for rock classification automation.

Description of the Prior Art

In order to provide this automation, various rock classification methods have been developed. They are notably described in the following documents:

Zhang, Y.; Li, M.; Han, S. (2018) Automatic Identification and Classification in Lithology Based on Deep Learning in Rock Images. Acta Petrol. Sin., 34, 333-342.

Wang, C., Li, Y., Fan, G., Chen, F., & Wang, W. (2018). Quick Recognition of Rock Images for Mobile Applications. Journal of Engineering Science & Technology Review, 11(4).

Ran, X., Xue, L., Zhang, Y., Liu, Z., Sang, X., & He, J. (2019). Rock Classification from Field Image Patches Analyzed Using a Deep Convolutional Neural Network. Mathematics, 7(8), 755.

Zhang, Y., Wang, G., Li, M., & Han, S. (2018). Automated Classification Analysis of Geological Structures Based on Images Data and Deep Learning Model. Applied Sciences, 8(12), 24.

These documents concern in particular the determination of a lithologic facies of a rock sample using a direct supervised classification method, from an image (a photograph for example). These methods use direct determination of the lithologic facies from the image as a whole and without intermediate analysis. However, this direct determination can generate errors because it directly uses the image of the rock sample without taking account of the naturalistic features of the rock.

SUMMARY OF THE INVENTION

The present invention automatically and precisely classifies a rock. The present invention therefore relates to a rock classification method wherein at least one image of the rock to be classified is acquired, and wherein a decision tree classifying the rocks according to several descriptors is used, as well as a machine learning method from a rock image database. Machine learning is applied for each descriptor considered so as to precisely determine descriptors of the rock to be classified, which enables precise classification of the rock by use of the decision tree.

The invention relates to a method of classifying a rock by use of a rock image database. This method comprises carrying out the following steps:
 a) constructing a decision tree that classifies the rocks according to a plurality of descriptors characterizing the rocks;
 b) associating with each image of the rock image database the descriptors characterizing the rock;
 c) acquiring at least one image of the rock to be classified;
 d) determining at least one descriptor for the at least one acquired image of the rock to be analysed by use of machine learning from the rock image database with the machine learning being applied to each descriptor being considered; and
 e) classifying the rock to be classified by use of the at least one determined descriptor and of the constructed decision tree.

According to one embodiment, the decision tree is a decision tree of naturalistic description of the rocks.

According to one implementation, the at least one image of the rock to be classified is acquired by photography, microscopy, or using a scanner.

Advantageously, the image of the rock to be classified is acquired by photography by use of a smartphone.

According to one aspect, the decision tree classifies the lithologic facies of the rock.

Preferably, at least one descriptor characterizing the rock is selected from among the origin of the rock, the chemistry of the rock, the presence of foliation, the presence of olivine, the presence of bedding, and the presence of mica.

Advantageously, the machine learning uses a neural network, preferably a convolutional neural network.

According to a feature, the method comprises a step of pre-processing the at least one acquired image prior to the step of determining at least one descriptor of the at least one acquired image.

According to an embodiment, the method comprises a step of inserting into the rock image database the at least one acquired image and the at least one associated determined descriptor.

Furthermore, the invention relates to a soil or subsoil exploitation method wherein the following steps are carried out:
 a) classifying at least one rock of the soil or the subsoil by means of the rock classification method according to one of the above features; and
 b) exploiting the soil or the subsoil according to the classification of the at least one rock.

According to an embodiment, the soil or subsoil exploitation concerns the construction of a structure on the soil or in the subsoil, the storage of gas in the subsoil or the exploitation of raw materials of the soil or the subsoil, preferably the raw materials being the rock itself, or a material or a fluid contained in the soil or the subsoil.

BRIEF DESCRIPTION OF THE FIGURES

Other features and advantages of the method according to the invention will be clear from reading the description hereafter of embodiments given by way of non-limitative example, with reference to the accompanying figures wherein:

FIG. 1 illustrates the steps of the method according to one embodiment of the invention;

FIG. 2 illustrates the steps of the method according to a second embodiment of the invention;

FIG. 3 illustrates the steps of the method according to a third embodiment of the invention;

FIG. 4 illustrates a decision tree according to an embodiment of the invention; and FIG. 5 illustrates a decision tree for an example embodiment of the invention for classification of the lithologic facies of a rock.

DETAILED DESCRIPTION OF THE INVENTION

The present invention relates to a rock classification method. Rock classification is understood to be the determination of a target characteristic of a rock. It may be identification of a rock, for example notably of the lithologic facies of the rock. It may also concern petrophysical property ranges such as grain size and porosity, or geologic age and formation condition ranges, the history of the rock mechanics, etc. The method according to the invention uses a rock image database, it may be a database with images of different rocks.

The method according to the invention comprises the following steps:
1. Decision tree construction;
2. Associating descriptors with the rock image database;
3. Rock image acquisition;
5. Descriptors determination; and
6. Rock classification.

The method according to the invention can be implemented by use of a computer system, notably a computer, a smartphone, etc. Steps 1) and 2) can be carried out in this order or simultaneously. Steps 1) and 2) can be carried beforehand and they can be carried out offline. Steps 3) to 6) can be carried out online. These steps are described in detail in the rest of the description.

FIG. 1 schematically illustrates, by way of non-limitative example, the steps of the method according to one embodiment of the invention. A decision tree ARB classifying the rocks according to descriptors (characteristics) is constructed beforehand, and descriptors (among those used in the decision tree) are associated with each image of rock image database BIR. Machine learning APP is performed from the rock image database. An image IMA of the rock to be classified is acquired online Onl, then, by use of machine learning APP, descriptors desc (only three are shown) of the rock to be classified are determined by inference INF, and these descriptors desc are applied to decision tree ARB in order to determine DET the classification car of the rock to be classified.

According to one embodiment, the method can further comprise a step of image pre-processing. In this case, the method according to the invention comprises the following steps:
1. Decision tree construction;
2. Associating descriptors with the rock image database;
3. Rock image acquisition;
4. Image pre-processing;
5. Descriptors determination; and
6. Rock classification.

The method according to the invention can be implemented by use of a computer system, notably a computer, a smartphone, etc. Steps 1) and 2) can be carried out in this order or simultaneously. Steps 1) and 2) can be carried beforehand and they can be carried out offline. Steps 3) to 6) can be carried out online. These steps are described in detail in the rest of the description.

FIG. 2 schematically illustrates, by way of non-limitative example, the steps of the method according to this embodiment of the invention. A decision tree ARB classifying the rocks according to descriptors (characteristics) is constructed beforehand, and descriptors (among those used in the decision tree) are associated with each image of rock image database BIR. Machine learning APP is performed from the rock image database. An image IMA of the rock to be classified is acquired online Onl, then pre-processing PRT of the acquired image is performed, then, by use of machine learning APP, descriptors desc (only three are shown) of the rock to be classified are determined by inference INF, and these descriptors desc are applied to decision tree ARB in order to determine DET the classification car of the rock to be classified.

According to an implementation of the invention, the method can further comprise a step of updating the image database with the acquired image. In this case, the method according to the invention comprises the following steps:
1. Decision tree construction;
2. Associating descriptors with the rock image database;
3. Rock image acquisition;
5. Descriptors determination;
6. Rock classification; and
7. Updating the image database.

The method according to the invention can be implemented by use of a computer system, notably a computer, a smartphone, etc. Steps 1) and 2) can be carried out in this order or simultaneously. Steps 1) and 2) can be carried beforehand and they can be carried out offline. Steps 3) to 7) can be carried out online. These steps are described in detail in the rest of the description.

FIG. 3 schematically illustrates, by way of non-limitative example, the steps of the method according to this embodiment of the invention. A decision tree ARB classifying the rocks according to descriptors (characteristics) is constructed beforehand, and descriptors (among those used in the decision tree) are associated with each image of rock image database BIR. Machine learning APP is performed from the rock image database. An image IMA of the rock to be classified is acquired online Only then, by use of machine learning APP, descriptors desc (only three are shown) of the rock to be classified are determined by inference INF, and these descriptors desc are applied to decision tree ARB in order to determine DET the classification car of the rock to be classified. Finally, the new acquired image and the associated descriptors are added to machine learning APP. This step is illustrated by the arrows relative to descriptors desc pointing towards the machine learning step.

The embodiments described above can be combined to combine the effects thereof. The method can then comprise a step of pre-processing the image and a step of updating the rock image database.

1. Decision Tree Construction

This step constructs a decision tree that classifies the rocks according to several descriptors (referred to as auxiliary characteristics, different from the target characteristic) classifying the rock. A decision tree is a tool representing a set of options using a tree-like model. The various possible decisions are located at the ends of the branches (the "leaves" of the tree), and they are reached depending on the decisions made at each step. In the present case, each step corresponds to a value of a descriptor, and each branch end corresponds to a rock classification. It is thus possible to precisely determine the classification of a rock by use of several descriptors. Indeed, when the descriptors are known, all the steps allowing to reach the end of a single branch of the decision tree are obtained. It is possible that, to reach the end of a branch of the decision tree, all the descriptors are not used.

FIG. 4 schematically illustrates, by way of non-limitative example, a decision tree that can be used for the method according to the invention. In this figure, the descriptors are denoted by desc1, desc2, desc3 and desc4, and they are identified by dotted vertical lines, the values of the descriptors are denoted by letters a to m, and the rock classifications are denoted from car1 to car8. For this example, the first decision corresponds to descriptor desc1 that can take the values a or b. When first descriptor desc1 is a, second descriptor desc2 can take the values c or d, whereas when first descriptor desc1 is b, second descriptor desc2 is e or f, and so on. By combining three levels of descriptors, the classification of the rock is determined. For example, if first descriptor desc1 is a, second descriptor desc2 is c and third descriptor desc3 is g, then the associated classification is classification car1.

According to an embodiment of the invention, the decision tree can be constructed from a naturalistic description of the rocks. In other words, the descriptors and the classifications can be selected to correspond to the rock families. This embodiment allows a naturalistic classification of the rocks to be selected.

For example, for the embodiment wherein the classification corresponds to the lithologic facies of the rock, the classifications may notably be: dunite, gabbro, orthogneiss, granite, basalt, mica schist, schist, etc. For this embodiment, at least one naturalistic rock descriptor can be determined. In particular, the naturalistic rock descriptor can notably be selected from among:
  origin of the rock: it may notably be plutonic, effusive or basic;
  chemistry of the rock: it may notably be acidic or basic;
  presence of foliation: it may be present or absent;
  presence of olivine: it may be present or absent;
  presence of bedding: it may be present or absent; or
  presence of mica: it may be present or absent.

These (non-limitative) descriptors provide good discrimination of the most frequently encountered rocks. Indeed, these descriptors allow accounting for the texture, the origin, the structure (bedding, folia), the color related to the chemistry of the rock, and the presence of specific minerals (olivine, mica).

FIG. 5 schematically illustrates, by way of non-limitative example, a decision tree for this embodiment. In this figure, the symbols are identical to those used in FIG. 4. The first descriptor concerns the origin, which may be plutonic (a), effusive (b) or sedimentary (c). When the origin is plutonic (a) or effusive (b), the second descriptor concerns the chemistry, which may be basic (d, f) or acidic (e, g). When the origin is sedimentary (c), the second descriptor is the foliation that may be present (h) or absent (i). When the origin is plutonic (a) and the chemistry basic (d), the third descriptor is the olivine that may be present (j) or absent (k). In this case, if olivine is present (j), then the rock is a dunite, and if it is absent (k), the rock is a gabbro. When the origin is plutonic (a) and the chemistry acidic (e), the third descriptor is the bedding that may be present (l) or absent (m). In this case, if the bedding is present (l), the rock is an orthogneiss, and if it is absent (m), the rock is a granite. When the origin is effusive (b) and the chemistry basic (f), the rock is a basalt. When the origin is effusive (b) and the chemistry acidic (g), the rock is of another type N/C. When the origin is sedimentary (c) and foliation is present (d), the third descriptor is the presence of mica, which may be present (n) or absent (o). In this case, if mica is present (n), the rock is a mica schist, and if it is absent the rock is a schist. When the rock is sedimentary (a) and foliation is absent (i), the rock is of another type N/C.

Within the decision tree, the number of steps and values of each branch is not limited to the examples of FIGS. 4 and 5.

The number of classes (number of branch endpoints of the decision tree) depends on the desired precision for the rock classification. According to one aspect of the invention, for the embodiment wherein the method classifies the lithologic facies of the rock for a broad public, the number of classes can range between 5 and 30, preferably between 8 and 20. According to another aspect of the invention, for the embodiment wherein the method classifies the lithologic facies of the rock for a specialized public, the number of classes can range between 5 and 300, or even more.

2. Associating Descriptors with the Rock Image Database

This step associates with each image of the rock image database of multiple rock descriptors. The descriptors are those used for constructing the decision tree. One learning database is thus formed per descriptor being considered.

This association of descriptors can be performed by image processing, which can notably analyse the colors, shapes, dimensions of the rocks of the rock image database, or any other information contained in the image. According to a feature of the invention, the descriptors can also comprise geolocation of the image. This geolocation can be related to the image, notably if it originates from a photograph taken by a smartphone. Indeed, this descriptor allows comparing rocks having close geographical areas.

Alternatively, associating the images with the descriptors can be done by a user.

The number of rock images of the rock image database can depend on the number of descriptors considered in the decision tree. A large number of rock images allows the rock classification precision to be improved. However, a large number of rock images requires a large memory capacity and it may involve a significant execution time. The rock image database can comprise at least one image per rock classification. According to one embodiment, the rock image database can comprise about a hundred rock images, preferably the number of rock images can be several hundred rock images, preferably the number of rock images can be several thousand rock images, or even several ten thousand rock images.

3. Rock Image Acquisition

This step acquires at least one image of the rock to be classified. Preferably, it can be a digital image.

According to one implementation of the invention, a microscopic or macroscopic image can be acquired. It may be an image of a thin section of a rock, an image of a rock sample or an image of an outcrop (cliff for example). It is thus possible to determine the classification of the rock whatever the information available.

According to one embodiment of the invention, the image of the rock to be classified can be acquired by photography, microscopy, a scanner or any other similar way. These ways enable simple acquisition only requiring conventional equipment.

According to an example embodiment, the rock image can be acquired by photography using a smartphone. Thus, acquisition of the rock image requires no significant equipment and it can be performed anywhere, without any technical prerequisite.

In order to improve the rock classification precision, several images of the rock can be acquired.

4. Image Pre-Processing

This is an optional step of the method. It pre-processes the image acquired in step 3) prior to the step of determining the descriptors of the acquired image. This step notably allows improving the descriptor determination precision.

According to one embodiment of the invention, pre-processing the acquired image can select a zone of interest in the acquired image. For example, pre-processing can allow removing the image background that does not correspond to the rock to be classified.

In a variant, pre-processing can modify the image, notably in terms of contrast, brightness, enlargement, etc.

According to one implementation of the invention, pre-processing can be related to the image acquisition method, for example polarized light, infrared wavelength, etc.

5. Descriptors Determination

This step determines at least one descriptor of the acquired image of the rock to be classified by use of machine learning from the rock image database and the descriptors associated in step 2), and by application to the image acquired in step 3) (and possibly pre-processed in step 4). One machine learning process is then applied per descriptor being considered, and a plurality of descriptors of the acquired image are obtained.

This step allows, for each descriptor being considered, to compare the acquired image with the rock images of the rock image database, and thus to classify the acquired image among the image families having the same properties. Several characteristics (several descriptors) of the rock to be classified are thus determined independently, which allows the rock classification to be precisely determined.

According to one implementation, this step can use image processing (colors, shapes, dimensions, etc.) to perform machine learning.

According to one embodiment of the invention, machine learning uses a neural network, preferably a convolutional neural network. The convolutional neural network is particularly suitable for image processing.

Alternatively, the machine learning technique used can be of any type, notably a non-convolutional neural network, a random forest method, a support vector machine (SVM) or a Gaussian process method.

6. Rock Classification

This step classifies the rock by applying the decision tree constructed in step 1) with the descriptors determined in step 5). In other words, knowing the descriptors, the decisions of the decision tree are known, and the branch end of the decision tree corresponding to the rock to be classified can therefore be known. This branch then indicates the classification of the rock.

For an image of a rock to be classified, the decision tree of the example corresponding to the embodiment of FIG. 5 and the following descriptors determined in step 5) are applied:
origin: plutonic
chemistry: acidic
bedding: presence.

Therefore, according to the decision tree, the rock to be classified is an orthogneiss, which corresponds to the classification made by a geologist.

It is noted that, for this rock type, a method of the prior art using the same rock image database and the same predictor (convolutional neural network), and as described in the preamble of the description, has classified this rock as granite. Therefore, the method according to the invention allows a rock to be classified with more precision than the methods according to the prior art.

According to one embodiment of the invention, the rock classification can be displayed on a computer system, a computer or a smartphone for example.

7. Updating the Image Database

It is noted that this step is optional in the method. It updates the rock image database with the acquired images. Thus, the learning bases of each descriptor can be expanded each time the method is implemented, which promotes the reliability and robustness of the method.

According to one implementation of the invention, the rock image database can be updated when the rock classification has been validated by another method (a method according to the prior art or by a geologist).

Furthermore, the invention relates to a soil or subsoil exploitation method wherein the following steps are carried out:
a) classifying at least one rock of at least one of the soil and subsoil by use of the rock classification method according to any one of the variants or variant combinations described above; and
b) exploiting at least one of the soil and subsoil according to the classification of the rock in the previous step.

Exploitation can notably concern the field of building or engineering structure construction, or the exploitation of raw materials, or gas storage, or the field of risk assessment, etc.

In the field of construction, the composition of at least one of rocky outcrops and of the subsoil is determined by classification of the rock, and construction is achieved by adapting notably the foundations, the structure of the building according to the rock classification. For these applications, a sample of the rock to be classified can be taken from the soil or the subsoil at shallow burial depth.

In the field of raw material exploitation (for example for quarries, mines, hydrocarbon recovery, etc.), the composition of at least one of the rocky outcrops and of the subsoil is determined by rock classification, and exploitation of the raw materials is performed (the raw materials can be the rock itself, a material, for example a metal or a fluid, for example hydrocarbons present in the subsoil), by allowing notably to determine suitable zones (i.e. drill areas, dig areas for mines or quarries, etc., for raw materials recovery), and to determine the methods and the tools to be used (for example enhanced oil recovery, drilling tools, the nature of the explosives for mines or quarries, etc.). For these applications, a sample of the rock to be classified can be taken at depth in the subsoil, it may originate from drill cuttings, or from an outcrop, etc.

In the field of gas storage, $CO_2$ for example, the composition of the subsoil is determined by rock classification, and storage of the gas in the subsoil is performed in a suitable zone, i.e. an underground zone suitable for gas storage without leakage risk.

In the field of risk assessment, the composition of a rocky outcrop (cliff) is determined by rock classification, and consolidation operations are carried out if there is a risk of collapse or landslide of the rocky outcrop.

Thus, this method enables exploitation of at least one of the soil and subsoil in a simple and fast manner, without the need to interact with a geology expert. The method also allows very large amounts of rocks to be treated more rapidly.

Another possible application of the method according to the invention is information to the public about the rock classification (geotourism).

The invention is not restricted to the embodiments described above by way of example and that it encompasses all variant embodiments.

The invention claimed is:

1. A soil or subsoil exploitation method using a computer based method that classifies rocks based on rock images of the rocks to be classified which are stored in a rock image database comprising:
   a) constructing a decision tree classifying the rock images using at least one descriptor that characterizes each of the rocks, the decision tree classifying lithologic facies of the rocks by using the descriptors to characterize the rocks which are selected from among an origin of the rocks, chemistry of the rocks, presence of foliation, presence of olivine, presence of bedding, and presence of mica;
   b) associating descriptors characterizing the rocks to the rock images of the rock image database;
   c) acquiring the rock images of the rock to be classified by at least one of photography, microscopy, and scanning of the rocks;
   d) training a machine learning method including a neural network on the descriptors characterizing the rocks associated with the stored rock images of the rock image database and determining the descriptors of the acquired rock images to be classified by applying the trained machine learning method to the descriptors characterizing the rocks associated with each rock image of the rock image database;
   e) determining the classification of the rocks to be classified by applying the decision tree to the determined descriptors of the rock images to be classified; and
   f) exploiting the soil or subsoil by performing construction on the soil or in the subsoil according to the determined classifications of the rocks.

2. The soil or subsoil exploitation method in accordance with claim 1, wherein the soil or subsoil exploitation includes at least one of constructing a structure on the soil or in the subsoil, storage of a gas in the subsoil, or exploiting raw materials on the soil or in the subsoil in accordance with the classification of the rocks.

3. The soil or subsoil exploitation method as claimed in claim 2, wherein the neural network comprises the rock image database.

4. The soil or subsoil exploitation method as claimed in claim 3, comprising inserting the rock images including the determined associated descriptors into the rock image database.

5. The soil or subsoil exploitation method as claimed in claim 3, comprising pre-processing the rock images prior to determining the associated descriptors of the rock images.

6. The soil or subsoil exploitation method as claimed in claim 2, comprising pre-processing the rock images prior to determining the descriptors of the rock images.

7. The soil or subsoil exploitation method as claimed in claim 2, comprising inserting the rock images including the determined associated descriptors into the rock image database.

8. The soil or subsoil exploitation method in accordance with claim 1, wherein raw materials used for the soil exploitation or subsoil exploitation are at least one of the classified rocks and a material or a fluid contained on the soil or in the subsoil, as determined from the classification of the rocks.

9. The soil or subsoil exploitation method as claimed in claim 8, wherein the neural network comprises the rock image database.

10. The soil or subsoil exploitation method as claimed in claim 9, comprising inserting the rock images including the determined associated descriptors into the rock image database.

11. The soil or subsoil exploitation method as claimed in claim 9, comprising pre-processing the rock images prior to determining the associated descriptors of the rock images.

12. The soil or subsoil exploitation method as claimed in claim 8, comprising pre-processing the rock images prior to determining the descriptors of the rock images.

13. The soil or subsoil exploitation method as claimed in claim 8, comprising inserting the rock images including the determined associated descriptors into the rock image database.

14. The soil or subsoil exploitation method as claimed in claim 1, wherein the decision tree comprises a naturalistic description of samples of the rocks obtained on the soil or in the subsoil.

15. The soil or subsoil exploitation method as claimed in claim 14, comprising pre-processing the rock images prior to determining the descriptors of the rock images.

16. The soil or subsoil exploitation method as claimed in claim 14, comprising inserting the rock images including the determined associated descriptors into the rock image database.

17. The soil or subsoil exploitation method as claimed in claim 1, wherein the neural network comprises the rock image database.

18. The soil or subsoil exploitation method as claimed in claim 17, comprising inserting the rock images including the determined associated descriptors into the rock image database.

19. The soil or subsoil exploitation method as claimed in claim 17, comprising pre-processing the rock images prior to determining the associated descriptors of the rock images.

20. The soil or subsoil exploitation method as claimed in claim 1, comprising pre-processing the rock images prior to determining the descriptors of the rock images.

* * * * *